(12) United States Patent
Yang et al.

(10) Patent No.: US 11,178,547 B2
(45) Date of Patent: Nov. 16, 2021

(54) IDENTITY-BASED MESSAGE INTEGRITY PROTECTION AND VERIFICATION FOR WIRELESS COMMUNICATION

(71) Applicant: Apple Inc., Cupertino, CA (US)

(72) Inventors: Xiangying Yang, Cupertino, CA (US); Shu Guo, Beijing (CN); Lijia Zhang, Beijing (CN); Qian Sun, Beijing (CN); Huarui Liang, Beijing (CN); Fangli Xu, Beijing (CN); Yuqin Chen, Shenzen (CN); Haijing Hu, Beijing (CN); Dawei Zhang, Saratoga, CA (US); Hao Duo, Beijing (CN); Lanpeng Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 315 days.

(21) Appl. No.: 16/293,521

(22) Filed: Mar. 5, 2019

(65) Prior Publication Data

US 2020/0021993 A1    Jan. 16, 2020

(30) Foreign Application Priority Data

Jul. 10, 2018    (WO) ................ PCT/CN2018/095137

(51) Int. Cl.
*H04W 12/10* (2021.01)
*H04W 72/04* (2009.01)
(Continued)

(52) U.S. Cl.
CPC ......... *H04W 12/106* (2021.01); *H04L 9/3268* (2013.01); *H04W 12/0433* (2021.01);
(Continued)

(58) Field of Classification Search
CPC ... H04L 63/123; H04L 9/3073; H04L 9/3297; H04L 9/3268; H04L 9/083; H04L 9/3247;
(Continued)

(56) References Cited

U.S. PATENT DOCUMENTS 5,398,285 A    3/1995 Borgelt et al.
7,716,482 B2   5/2010 Jung et al.
(Continued)

FOREIGN PATENT DOCUMENTS

CN    101938740 A    1/2011
CN    107592281 A    1/2018
(Continued)

OTHER PUBLICATIONS

Youngblood; "An Introduction to Identity-based Cryptography", CSEP 590TU, Mar. 2005, 7 pages.
(Continued)

*Primary Examiner* — Haresh N Patel
(74) *Attorney, Agent, or Firm* — Dickinson Wright RLLP

(57) ABSTRACT

Techniques for identity-based message integrity protection and verification between a user equipment (UE) and a wireless network entity, include use of signatures derived from identity-based keys. To protect against attacks from rogue network entities before activation of a security context with a network entity, the UE verifies integrity of messages by checking a signature using an identity-based public key $PK_{ID}$ derived by the UE based on (i) an identity value (ID) of the network entity and (ii) a separate public key $PK_{PKG}$ of a private key generator (PKG) server. The network entity generates signatures for messages using an identity-based private key $SK_{ID}$ obtained from the PKG server, which generates the identity-based private key $SK_{ID}$ using (i) the ID value of the network entity and (ii) a private key $SK_{PKG}$ that is known only by the PKG server and corresponds to the public key $PK_{PKG}$.

22 Claims, 9 Drawing Sheets

(51) Int. Cl.
*H04W 12/106* (2021.01)
*H04L 9/32* (2006.01)
*H04W 74/00* (2009.01)
*H04W 12/069* (2021.01)
*H04W 12/0433* (2021.01)
*H04W 72/00* (2009.01)

(52) U.S. Cl.
CPC ....... *H04W 12/069* (2021.01); *H04W 72/042* (2013.01); *H04W 74/006* (2013.01)

(58) Field of Classification Search
CPC .......... H04L 2209/80; H04W 12/0433; H04W 72/042; H04W 12/106; H04W 12/041; H04W 12/069; H04W 74/006
USPC .......................................................... 713/171
See application file for complete search history.

(56) References Cited

U.S. PATENT DOCUMENTS

| | | | |
|---|---|---|---|
| 9,379,891 B2 | 6/2016 | Yoon et al. | |
| 2003/0188174 A1* | 10/2003 | Zisowski | G06F 21/52 713/189 |
| 2007/0101125 A1* | 5/2007 | Lain | H04L 9/3265 713/156 |
| 2008/0002825 A1* | 1/2008 | Gueron | H04L 9/3249 380/30 |
| 2010/0211779 A1 | 8/2010 | Sundaram | |
| 2011/0041003 A1* | 2/2011 | Pattar | H04L 41/0654 714/4.3 |
| 2011/0099605 A1* | 4/2011 | Cha | H04W 12/086 726/3 |
| 2011/0302638 A1* | 12/2011 | Cha | H04L 63/08 726/6 |
| 2012/0278869 A1* | 11/2012 | Guccione | H04W 12/04 726/5 |
| 2014/0301554 A1* | 10/2014 | Cheng | H04L 9/3242 380/284 |
| 2015/0270975 A1* | 9/2015 | Buckley | H04L 63/126 713/156 |
| 2016/0094542 A1* | 3/2016 | Lee | H04L 63/0869 726/7 |
| 2017/0272945 A1* | 9/2017 | Link, II | H04L 9/3242 |
| 2017/0295489 A1* | 10/2017 | Agiwal | H04W 12/0433 |
| 2017/0366342 A1* | 12/2017 | Gehrmann | H04W 12/041 |
| 2017/0374070 A1* | 12/2017 | Shah | H04L 63/105 |
| 2018/0115539 A1* | 4/2018 | Muhanna | H04L 63/065 |
| 2018/0270064 A1* | 9/2018 | Gehrmann | H04L 9/3273 |
| 2018/0294959 A1* | 10/2018 | Traynor | H04W 12/06 |
| 2018/0375647 A1* | 12/2018 | Yan | H04W 4/70 |
| 2019/0260803 A1* | 8/2019 | Bykampadi | H04W 12/02 |
| 2019/0280875 A1* | 9/2019 | Ragnoni | H04L 63/12 |
| 2019/0349426 A1* | 11/2019 | Smith | H04L 67/104 |
| 2019/0349765 A1* | 11/2019 | Kolekar | H04W 12/069 |
| 2020/0366686 A1* | 11/2020 | Ga | H04L 63/123 |
| 2020/0371777 A1* | 11/2020 | Zhang | H04L 9/06 |
| 2020/0387893 A1* | 12/2020 | Maim | H04L 9/3234 |

FOREIGN PATENT DOCUMENTS

| | | |
|---|---|---|
| EP | 3468138 A1 | 4/2019 |
| WO | WO03034774 A2 | 4/2003 |
| WO | 2017/167741 A1 | 10/2017 |

OTHER PUBLICATIONS

Shamir, "Identity-Based Cryptosystems and Signature Schemes", in Advances in Cryptology—Crypto 1984, vol. 196 of Lecture Notes in Computer Science, Springer-Verlag, Department of Applied Mathematics, The Weizmann Institute of Science, Rehovot, 76100 Israel, pp. 47-53, 1984, 7 pages.

Harn et al.; "ID-Based Cryptographic Schemes for User Identification, Digital Signature, and Key Distribution", IEEE Journal on Selected Areas in Communications, vol. 11, No. 5, Jun. 1993, 4 pages.

ID-based encryption—Wikipedia, last edited Apr. 20, 2018 (Retrieved Jun. 27, 2018), 5 pages.

PCT Patent Application No. PCT/CN2018/095137—International Search Report and Written Opinion dated Mar. 25, 2019.

* cited by examiner

IDENTITY-BASED MESSAGE INTEGRITY PROTECTION AND VERIFICATION FOR WIRELESS COMMUNICATION

CROSS-REFERENCE TO RELATED APPLICATIONS

The present application claims the benefit of International Application No. PCT/CN2018/095137, entitled "IDENTITY-BASED MESSAGE INTEGRITY PROTECTION AND VERIFICATION FOR WIRELESS COMMUNICATION," filed Jul. 10, 2018, the content of which is incorporated by reference herein in its entirety for all purposes.

FIELD

The described embodiments set forth techniques for identity-based message integrity protection and verification when communicating messages between a wireless device and a wireless network entity, including use of signatures derived from identity-based keys for message integrity protection by a sending network entity and message integrity verification by the receiving wireless device.

BACKGROUND

Wireless communication, by nature of transmission through an open medium, is vulnerable to eavesdropping. In addition, rogue network entities, such as fake base stations, can impersonate genuine network entities in order to obtain private information from a wireless device or to misdirect the wireless to communicate with the rogue equipment. When associating with a cellular wireless network, a wireless device can perform an authentication and key agreement (AKA) procedure and subsequently activate a security context with the cellular wireless network, including establishing a set of keys for encryption and decryption as well as for integrity protection and verification of messages communicated between the wireless device and the cellular wireless network. Prior to security activation with the cellular wireless network, however, certain messages may be communicated in a clear, readable, unencrypted format that is open to snooping. Additionally, rogue network entities may send messages to the wireless device to redirect the wireless device improperly to a lower security wireless network or to cause the wireless device to reveal private information such as an unencrypted subscription permanent identifier (SUPI) of the wireless device. As the wireless device cannot verify integrity of messages received from network entities, whether genuine or rogue, before the security context is activated, the wireless device is vulnerable to security attacks.

SUMMARY

Representative embodiments set forth techniques for identity-based message integrity protection and verification when communicating messages between a wireless device, e.g., a user equipment (UE), and a wireless network entity, including use of signatures derived from identity-based keys for message integrity protection by a sending network entity and for message integrity verification by the receiving wireless device. To protect against attacks from rogue network entities, e.g., fake base stations, before activation of a security context with a network entity of a wireless network, the UE verifies integrity of messages received from the network entity by checking a signature of a received message using an identity-based public key $PK_{ID}$ derived by the UE. The public key $PK_{ID}$ is generated using (i) an identity value (ID) of the network entity that sent the message and (ii) a separate public key $PK_{PKG}$ of a public/private key pair maintained by a private key generator (PKG) server. The network entity generates signatures for messages using an identity-based private key $SK_{ID}$ that corresponds to the identity-based public key $PK_{ID}$. The identity-based private key $SK_{ID}$ is obtained by the network entity from the PKG server, which generates the identity-based private key $SK_{ID}$ using (i) the ID value of the network entity and (ii) a private key $SK_{PKG}$ that is known only by the PKG server and corresponds to the public key $PK_{PKG}$.

The UE obtains the ID value of the network entity based on one or more messages received from the network entity that include at least a portion of the ID value, such as a broadcast message that includes one or more of: a public land mobile network (PLMN) ID value, a next generation Node B (gNB) globally unique ID value, or a tracking area code (TAC) value. The ID value of the network entity can also include a time stamp that limits a time period during which the ID value is valid. Changes to the ID value of the network entity, such as an updated time stamp value, requires the network entity to obtain from the PKG server an updated private key $SK_{ID}$ based on the updated ID value. The UE also derives an updated public key $PK_{ID}$ based on the updated ID value. Signatures generated based on the private key $SK_{ID}$ are appended to one or more broadcast messages and/or to one or more unicast messages transmitted by the network entity to provide integrity protection for the messages. The UE verifies integrity of the received messages by checking the signature using the public key $PK_{ID}$. Messages for which integrity cannot be verified can be ignored and/or discarded by the UE.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
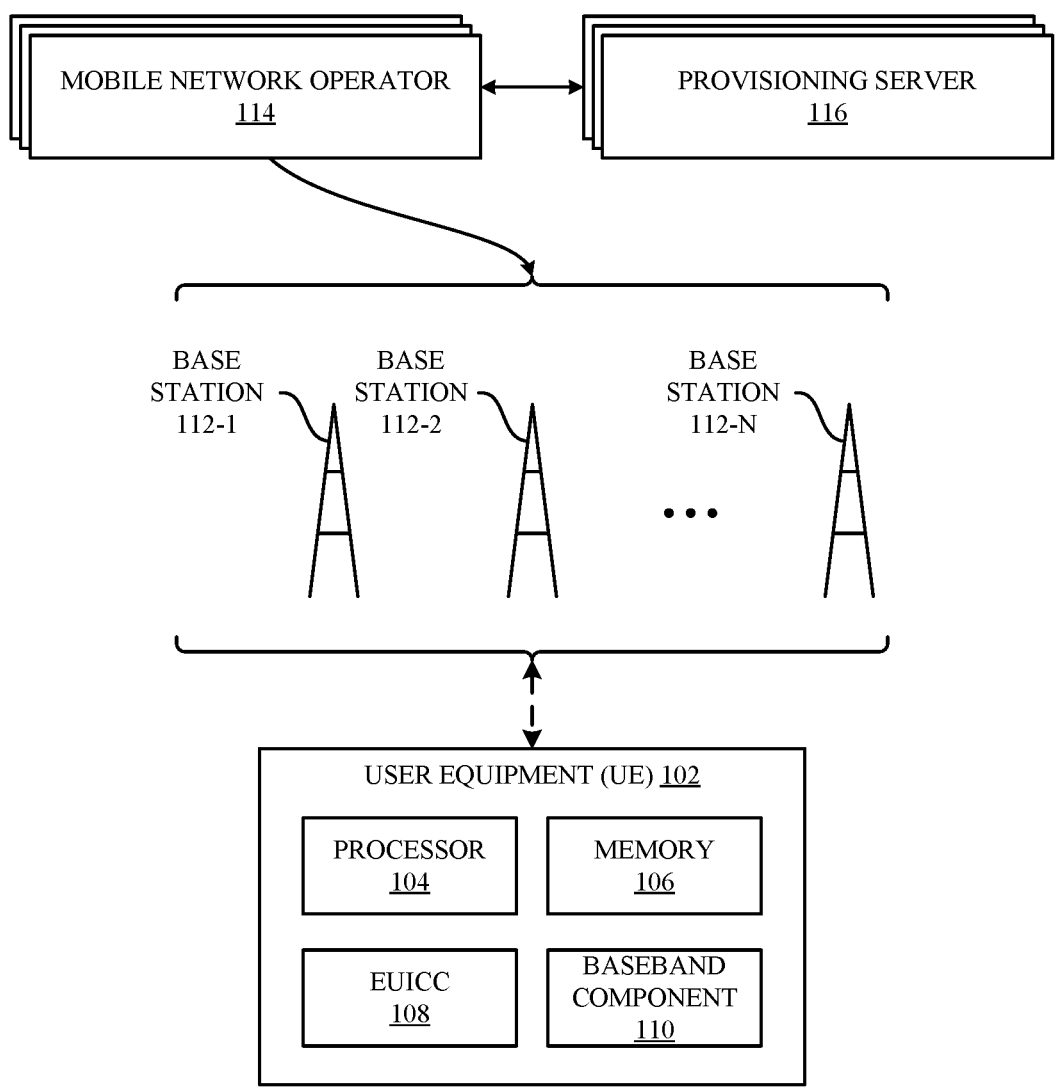
FIG. 1 illustrates a block diagram of different components of an exemplary system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Representative embodiments described herein set forth techniques for identity-based message integrity protection and verification when communicating messages between a wireless device, e.g., a user equipment (UE), and a wireless network entity, including use of signatures derived from identity-based keys for message integrity protection by a sending network entity and for message integrity verification by the receiving wireless device. Identity-based signatures are included with at least some messages provided by an access network entity, e.g., a NodeB (NB), evolved NodeB (eNB), next generation NodeB (gNB), or femto-cell home equivalents, to a wireless device before establishment of a security context between the access network entity and the wireless device. The security context at the access stratum (AS) level includes a set of ciphering keys used for encryption and decryption of message content and a set of message integrity keys for the protection and verification of messages from an AS level network entity. Similarly, the security context at the non-access stratum (NAS) level includes an additional set of ciphering keys used for encryption and decryption of signaling message content and an additional set of message integrity keys for the protection and verification of the signaling messages from a NAS level network entity. Separate ciphering keys can be used for signaling messages in the control plane and for data messages in the user plane, while keys for message integrity can be used for signaling messages in the control plane. Before these keys are established, signaling messages from an access network entity and/or from a core network entity can be sent unencrypted and/or without integrity verification signatures and thus be vulnerable to manipulation by a rogue network entity.

To protect against attacks from rogue network entities, e.g., fake base stations, before activation of the security context with a network entity of a wireless network, the UE verifies integrity of at least some messages received from the network entity by checking a signature of a received message using an identity-based public key $PK_{ID}$ derived by the UE. The public key $PK_{ID}$ is generated using (i) an identity value (ID) of the network entity that sent the message and (ii) a separate public key $PK_{PKG}$ of a public/private key pair maintained by a trusted third-party entity, namely a private key generator (PKG) server. All or a portion of the ID value of the network entity can be provided in a message to the UE, such as in a message broadcast by the network entity. In some embodiments, a portion of the ID value of the network entity may be obtained by the UE from storage in the UE and/or from a network accessible storage. In some embodiments, a portion of the ID value of the network entity may also be assembled by the UE, such as a time-based value. The public key $PK_{PKG}$ of the PKG server can be provided to the UE before the UE attempts to camp on and/or connect the wireless network of the network entity, such as during subscriber identity module (SIM) provisioning from a mobile network operator (MNO) server, during carrier bundle provisioning from a third-party server, during device manufacture, during device sales distribution, and/or by querying the PKG server directly for the public key $PK_{PKG}$. The public key $PK_{PKG}$ of the PKG server can also be broadcast to the UE by network entities in various access stratum (AS) system information block (SIB) messages and/or in various non-access stratum (NAS) messages. The messages can include the $PK_{PKG}$ along with a certificate that the UE can verify based on a certificate authority (CA) certificate that the UE and the PKG server have in common. Representative network entities that can communicate the $PK_{PKG}$ to the UE include those that provide the PKG server function and/or interface therewith. as those that provide the PKG server function or interface therewith. The UE can derive the identity-based public key $PK_{ID}$ by combining the PKG server's public key $PK_{PKG}$ and the identity value ID of the network entity using an algorithm known by the UE. The network entity generates signatures for one or more messages using an identity-based private key $SK_{ID}$ that corresponds to the identity-based public key $PK_{ID}$. The identity-based private key $SK_{ID}$ is obtained by the network entity from the PKG server, which generates the identity-based private key $SK_{ID}$ using (i) the ID value of the network entity and (ii) a private key $SK_{PKG}$ that is known only by the PKG server and corresponds to the public key $PK_{PKG}$. The private key $SK_{PKG}$ used to generate the identity-based private key $SK_{ID}$ is kept secret by the PKG server. An updated identity-based private key $SK_{ID}$ can be obtained by the network entity by subsequently providing an updated identity value ID to the PKG server and receiving an updated $SK_{ID}$ in return. Communication between the network entity and the PKG server can be through a secure connection.

The UE obtains the ID value of the network entity based on one or more messages received from the network entity that include at least a portion of the ID value, such as a broadcast message that includes one or more of: a public land mobile network (PLMN) ID value, a next generation Node B (gNB) globally unique ID value, or a tracking area code (TAC) value. The ID value of the network entity can also include a time stamp that limits a time period during which the ID value is valid. Changes to the ID value of the network entity, such as an updated time stamp value, requires the network entity to obtain from the PKG server an updated private key $SK_{ID}$ based on the updated ID value. The UE also derives updated public key $PK_{ID}$ values based on updated ID values as required. Signatures generated by the network entity and based on the private key $SK_{ID}$ are appended to one or more messages transmitted by the network entity to provide integrity protection for the messages. Representative message can include broadcast messages, multicast messages, and/or unicast messages. The UE verifies integrity of messages received from the network entity by checking the signature included with the message using the applicable public key $PK_{ID}$ for the network entity. Messages from a network entity for which message integrity cannot be verified using the public key $PK_{ID}$ derived from the identity value ID of the network entity can be ignored and/or discarded by the UE. In some embodiments, the signature is a full signature generated by the network entity using the private key $SK_{ID}$ as a signing key. In some embodiments, the signature is a partial, e.g., truncated, signature derived from the full signature. In some embodiments, the signature is a message authentication code (MAC) value that is calculated using a symmetric MAC key derived using a key derivation function (KDF) based on the private key $SK_{ID}$.

The UE can determine whether a network entity of a wireless network uses ID-based signature protection and verification of one or more messages based on an indication of network properties, such as a key or flag, that is included with a SIM profile provided during SIM provisioning by an MNO server and/or in a carrier configuration bundle provided by a third party server. In some embodiments, one or more system information block (SIB) messages can be integrity protected by including a signature signed by the network entity that broadcasts the SIB messages. In some embodiments, one or more public warning system (PWS) messages, such as an earthquake and tsunami warning system (ETWS) message, can be integrity protected by including a signature signed by the network entity that broadcasts the PWS message. In some embodiments, one or more unicast messages sent during a random access channel (RACH) procedure, such as a random access response (RAR) message, can be integrity protected by including a signature signed by the network entity that transmits the unicast message to the UE. In some embodiments, one or more radio resource control (RRC) signaling messages sent to the UE before activation of a security context between the UE and the network entity can be integrity protected by including a signature signed by the network entity that transmits the RRC signaling message to the UE. Representative RRC signaling messages that can be integrity protected include RRC configuration messages and RRC redirection messages, such as those messages used for a circuit-switched fallback (CSFB) procedure. In some embodiments, one or more NAS level messages communicated by a core network entity to the UE can be message integrity protected by including a signature signed by the network entity that generates the NAS level message. Representative core network entities include an access and mobility management function (AMF), a mobility management entity (MME), an authentication server function (AUSF), or home subscriber server (HSS). Message integrity protection can provide additional certainty to a UE for critical messages that request private information from a UE or redirect a UE. Representative messages generated upon failure of retrieval of a UE context can include such messages as identity request messages or attach reject messages. Representative identity request messages include those that request the UE provide an unencrypted identifier, e.g., an international mobile subscriber identity (IMSI) or a subscription permanent identifier (SUPI). As NAS messages are embedded within RRC messages, in various embodiments, the embedded NAS message may include a signature, the encompassing RRC message may include a signature, or both the NAS and RRC messages may each include a signature.

To protect against fraudulent misuse of a network entity that may be vulnerable to hacking, the private key $SK_{ID}$ provided to the network entity can be restricted to be used only during a finite time period that is specified in the ID value used to generate the private key $SK_{ID}$. The network entity can obtain a new private key $SK_{ID}$ for each finite time period. In some embodiments, the ID value includes a field that specifies a time period for which the ID value and the resulting private key $SK_{ID}$ are valid. For example, the ID value can include a field having a string value such as "YYYY|MM|WW" to indicate a specific year, month, and week during which the ID value and private key $SK_{ID}$ are valid. In some embodiments, the PKG server can determine whether to provide an updated private key $SK_{ID}$ to a network entity based on the ID value submitted to the PKG server. In some embodiments, the PKG server can deny providing an updated private key $SK_{ID}$ to a network entity, such as responsive to a report that the network entity has been compromised. In some embodiments, the ID value can include a field that indicates a particular type of operation for the network entity, e.g., a field having a string value that contains "CSG" as an indication that the network entity is intended for connections with a closed subscriber group (CSG). As such, the network entity that includes a CSG value cannot be changed to operate as a public cell, rather than as a private femto-cell as intended by the MNO with which the femto-cell is associated. A UE can recognize a network entity as a private femto-cell based on the presence of the CSG value in the network entity's ID and can avoid communicating private information or following redirection commands that may indicate the network entity is masquerading as a public cell. Redirection commands can include directing a UE to move to a circuit-switched network as part of a CSFB procedure. Requests for private information, such as for an IMSI/SUPI, can occur during error handling procedures when a core network entity fails to retrieve a UE context.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or fifth generation (5G) or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that some UEs described herein may be configured as multi-mode wireless communication devices that are also capable of communicating via different third generation (3G) and/or second generation (2G) RATs. In these scenarios, a multi-mode user equipment (UE) can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

These and other embodiments are discussed below with reference to FIGS. 1 through 8; however, those skilled in the art will readily appreciate that the detailed description given herein with respect to these figures is for explanatory purposes only and should not be construed as limiting.

FIG. 1 illustrates a block diagram of different components of a system 100 that is configured to implement the various techniques described herein, according to some embodiments. More specifically, FIG. 1 illustrates a high-level overview of the system 100, which, as shown, includes a user equipment (UE) 102, a group of base stations 112-1 to 112-*n* that are managed by different Mobile Network Operators (MNOs) 114, and a set of provisioning servers 116 that are in communication with the MNOs 114. The UE 102 can represent a mobile computing device (e.g., an iPhone® or an iPad® by Apple®), the base stations 112-1 to 112-*n* can represent cellular wireless network entities including evolved NodeBs (eNBs) and/or next generation NodeBs (gNBs or gNB) that are configured to communicate with the UE 102, and the MNOs 114 can represent different wireless service providers that provide specific services (e.g., voice and data) to which the UE 102 can be subscribed.

As shown in FIG. 1, the UE 102 can include processing circuitry, which can include a processor 104 and a memory 106, an embedded Universal Integrated Circuit Card (eUICC) 108, and a baseband component 110. In some embodiments, the UE 102 includes one or more physical Subscriber Identity Module (SIM) cards (not shown) in addition to or substituting for the eUICC. The components of the UE 102 work in conjunction to enable the UE 102 to provide useful features to a user of the UE 102, such as localized computing, location-based services, and Internet connectivity. The eUICC 108 can be configured to store multiple electronic SIMs (eSIMs) for accessing different MNOs 114 through the base stations 112-1 to 112-*n*. For example, the eUICC 108 can be configured to store and manage one or more eSIMs for one or more MNOs 114 for different subscriptions to which the UE 102 is associated. To be able to access services provided by the MNOs, an eSIM can be provisioned to the eUICC 108. In some embodiments, the eUICC 108 obtains one or more eSIMs (or updates for one or more eSIMs) from one or more associated provisioning servers 116. It is noted that provisioning servers 116 can be maintained by a manufacturer of the UE 102, the MNOs 114, third party entities, and the like. Communication of eSIM data between a provisioning server 116 and the eUICC 108 (or between the provisioning server 116 and processing circuitry of the UE 102 external to the eUICC 108, e.g., the processor 104) can use a secure communication channel.

Figure 2:
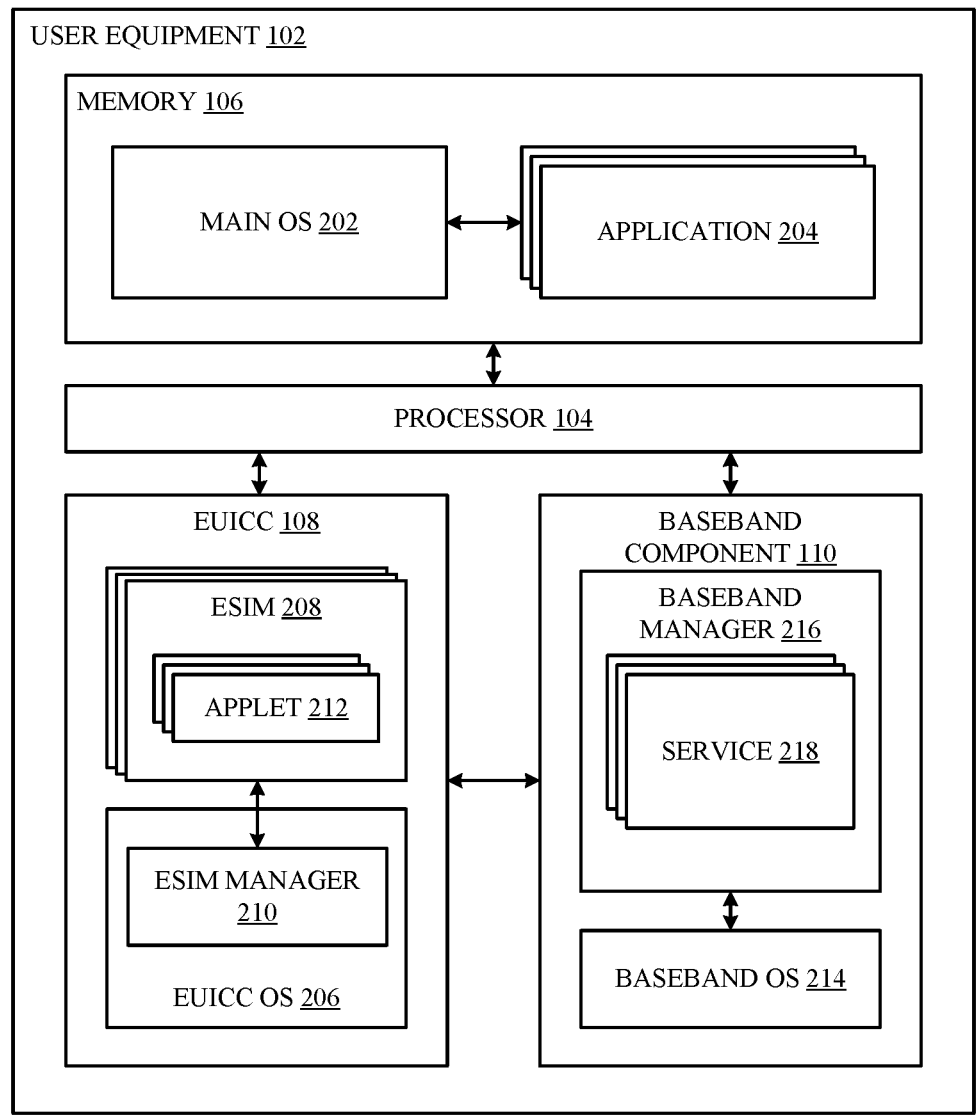
FIG. 2 illustrates a block diagram of a more detailed view of exemplary components of the system of FIG. 1, according to some embodiments.

FIG. 2 illustrates a block diagram of a more detailed view 200 of particular components of the UE 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by enabling, disabling, modifying, or otherwise performing management of the eSIMs 208 within the eUICC 108 and providing the baseband component 110 with access to the eSIMs 208 to provide access to wireless services for the UE 102. The eUICC 108 OS can include an eSIM manager 210, which can perform management functions for various eSIMs. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the UE 102 to communicate with an MNO 114 and provide useful features (e.g., phone calls and internet) to a user of the UE 102.

As also shown in FIG. 2, the baseband component 110 of the UE 102 can include a baseband OS 214 that is configured to manage hardware resources of the baseband component 110 (e.g., a processor, a memory, different radio components, etc.). According to some embodiments, the baseband component 110 can implement a baseband manager 216 that is configured to interface with the eUICC 108 to establish a secure channel with a provisioning server 116 and obtaining information (such as eSIM data) from the provisioning server 116 for purposes of managing eSIMs 208. The baseband manager 216 can be configured to implement services 218, which represents a collection of software modules that are instantiated by way of the various applets 212 of enabled eSIMs 208 that are included in the eUICC 108. For example, services 218 can be configured to manage different connections between the UE 102 and MNOs 114 according to the different eSIMs 208 that are enabled within the eUICC 108.

Figure 3:
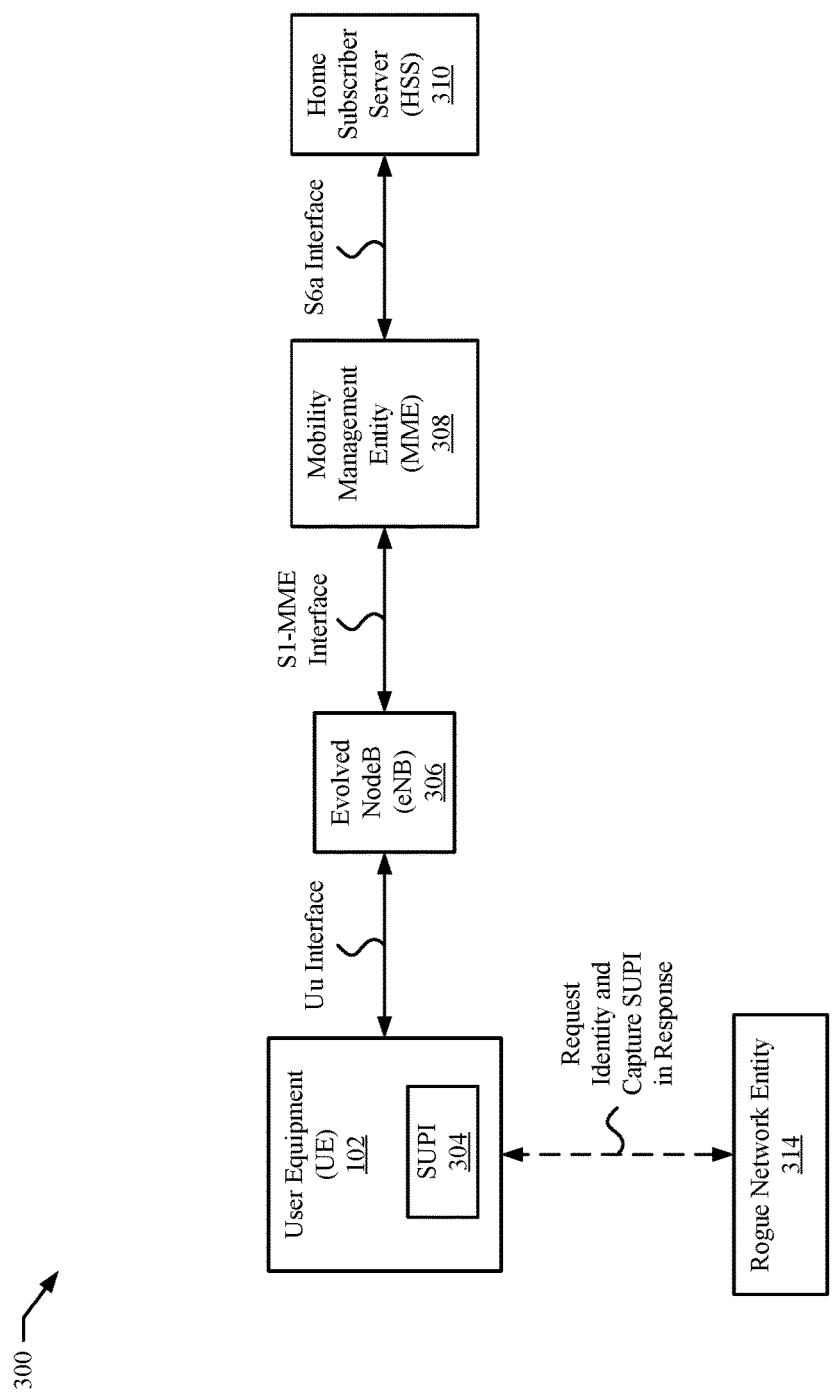
FIG. 3 illustrates a block diagram of an exemplary system subject to attach by a rogue network entity, according to some embodiments.

FIG. 3 illustrates a block diagram 300 of an exemplary system subject to attack by a rogue network entity. The system includes a UE 102, which includes private information, such as an unencrypted subscription permanent identifier (SUPI) 304 by which a subscription for a user of the UE 102 can be uniquely identified, in communication with an exemplary genuine cellular wireless network entity, namely an evolved NodeB (eNB) 306. An example of a SUPI 304 includes an international mobile subscriber identity (IMSI). The UE 102 and the eNB 306 can communicate via a Uu interface, which for some messages or for certain periods of time, such as prior to establishment of a secure connection between the UE 102 and the eNB 306, can be subject to eavesdropping by a third party, such as by the rogue network entity 314. While the eNB 306 connects to a Mobility Management Entity (MME) 308 of the core network via a secure S1-MME interface, and the MME 308 connects to a Home Subscriber Server (HSS) 310 via a secure S6a interface, the eNB 306 can send some messages to and receive some messages from the UE 102 "in the clear". The rogue network entity 314 can mimic communication from a genuine wireless network entity, such as from the eNB 306 and/or from the MME 308, and can request that the UE 102 provide information that should only be sent to a genuine wireless network entity. For example, the rogue network entity 314 can send a Request Identity message to the UE 102, which can unknowingly respond to the rogue network entity 314 with an Identity Response message that includes the unencrypted SUPI 304 of the UE 102.

The Uu interface between the UE 102 and the eNB 306 is also vulnerable to attacks in which the rogue network entity 314 seeks to extract information from the UE 102 and/or to misdirect the UE 102 to lower its security. Exemplary attacks include the rogue network entity 314 sending a radio resource control (RRC) redirection command as part of a CSFB procedure to cause the UE 102 to move to a fake base station (not shown) that imitates a wireless network that does not have advanced security measures, e.g., from a 4G/5G network e/gNB to a 2G/3G network. The rogue network entity 314 can also manipulate the UE 102 to obtain private information by re-appropriating error handling mechanisms, e.g., by requesting that the UE send its SUPI/IMSI as a result of a fictitious UE context retrieval failure. Until a security context is established for access stratum (AS) communication between the UE 102 and the eNB 306 (or equivalently gNB) and for non-access stratum (NAS) communication, messages received by the UE 102 may be suspect and subject to misuse without a mechanism to verify message integrity. While FIG. 3 illustrates the UE 102 connected to the eNB 306 of an LTE network, a similar architecture for a fifth generation (5G) in which the UE 102 communicates through a next generation NodeB (gNB) is also subject to eavesdropping before a security context is established between the UE 102 and network entities of the wireless network.

The techniques presented herein can apply to any messages communicated between the UE 102 and a cellular wireless network entity, including over insecure connections susceptible to eavesdropping. Examples of a wireless network entity include a radio access network entity, such as the eNB 306 or a next generation NodeB (also referred to as a gNodeB or gNB), or a core network entity, such as the MME 308, the HSS 310, an authentication server function (AUSF), or an access and mobility management function (AMF). As described further herein, the UE 102 can verify one or more messages that include identity-based signatures received from a network entity, including an access network entity such as an eNB 306 or gNB.

Figure 4A:
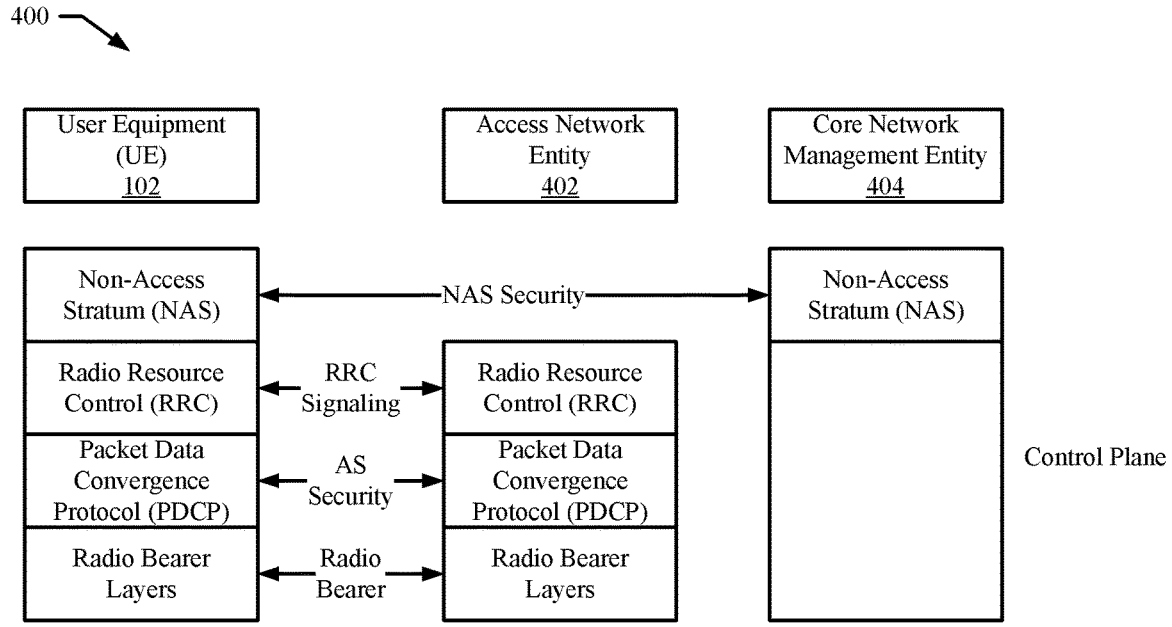
FIGS. 4A and 4B diagrams of communication protocol stacks that include message security for signaling messages and data packets after establishment of a security context between a wireless device and network entities of a wireless network, according to some embodiments.
Figure 4B:
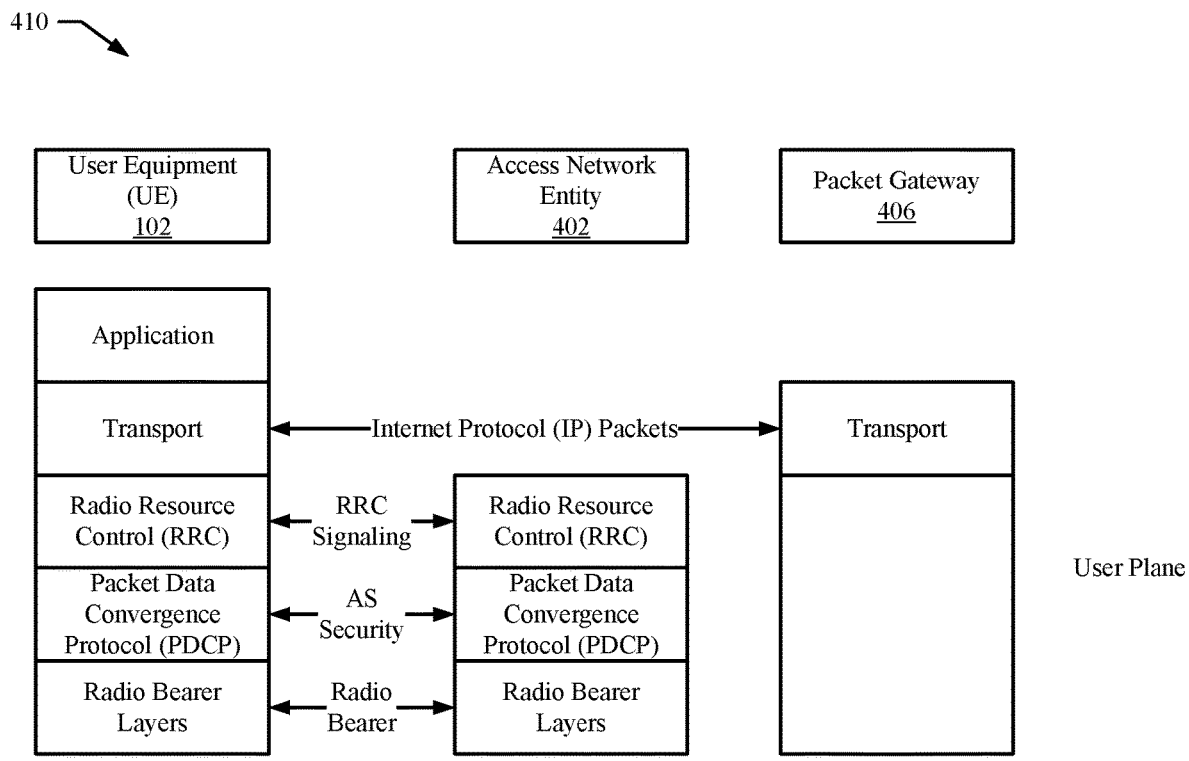

FIGS. 4A and 4B illustrate diagrams 400/410 of communication protocol stacks that include message security for signaling messages and data packets after establishment of a security context between a wireless device and network entities of a wireless network. During an authentication and key agreement (AKA) procedure, the UE 102 can establish a security key, e.g., an encryption/decryption key, for communication between the UE 102 and a core network management entity 404, e.g., the mobility management entity (MME) 308 of an LTE network or an equivalent AMF of a 5G network. Using a key derivation function (KDF) for an identified encryption algorithm, the UE 102 can derive from the security key obtained as part of the AKA procedure a NAS encryption/decryption key to use for encrypting and decrypting NAS messages communicated between the core network management entity 404 and the UE 102 in the control plane. Similarly, using the KDF for an identified integrity algorithm, the UE 102 can derive a NAS integrity key to use for verifying the integrity of messages received from the core network management entity 404 via the control plane. The NAS encryption/decryption key and NAS integrity key are used to protect NAS level messages. Additionally, using the KDF for another identified encryption algorithm, the UE 102 can derive an AS encryption/decryption key to use for encrypting and decrypting AS signaling messages communicated between an access network entity 402 and the UE 102. Furthermore, the UE 102 can derive an AS integrity key to use for verifying the integrity of signaling messages received from the access network entity 402. RRC signaling messages can be encrypted and decrypted and integrity protected and verified at a packet data convergence protocol (PDCP) layer before being provided to and after being received from radio bearer layers that transport the RRC signaling messages via radio bearers. The AS encryption/decryption key and AS integrity key are used to protect AS level signaling messages in the control plane. Data messages communicated via the user plane can also be encrypted and decrypted using an additional AS encryption/decryption key to protect Internet Protocol (IP) packets communicated via the transport layer between the UE 102 and an applicable data gateway, e.g., a packet gateway 406. The combination of NAS keys and AS keys provide a complete security context for communication between the UE 102 and network entities of the wireless network. Prior to establishment of these NAS and AS keys, one or more signaling messages may be subject to eavesdropping and/or misuse by a rogue network entity. Protecting at least some of such signaling messages can be accomplished as described further herein using ID-based signatures that accompany the signaling messages, where the ID-based signatures are generated using a private key obtained by the network entity from a trusted private key generator (PKG) server over a secure connection. The rogue network entity will not have access to the private key of a genuine network entity. The private key is based on an ID of the network entity and also based on a private key of the PKG server that remains secret and is not shared by the PKG server with the network entity. The UE 102 can verify integrity of a message by checking an accompanying signature using a public key that corresponds to the private key of the network entity. The UE 102 can derive the public key of the network entity using the ID of the network entity and a public key of the PKG server that corresponds to the secret, unshared, private key of the PKG server. Signaling messages, once verified, can be trusted by the UE 102, and signaling messages that cannot be verified, can be treated as suspect and ignored and/or discarded by the UE 102.

Figure 5A:
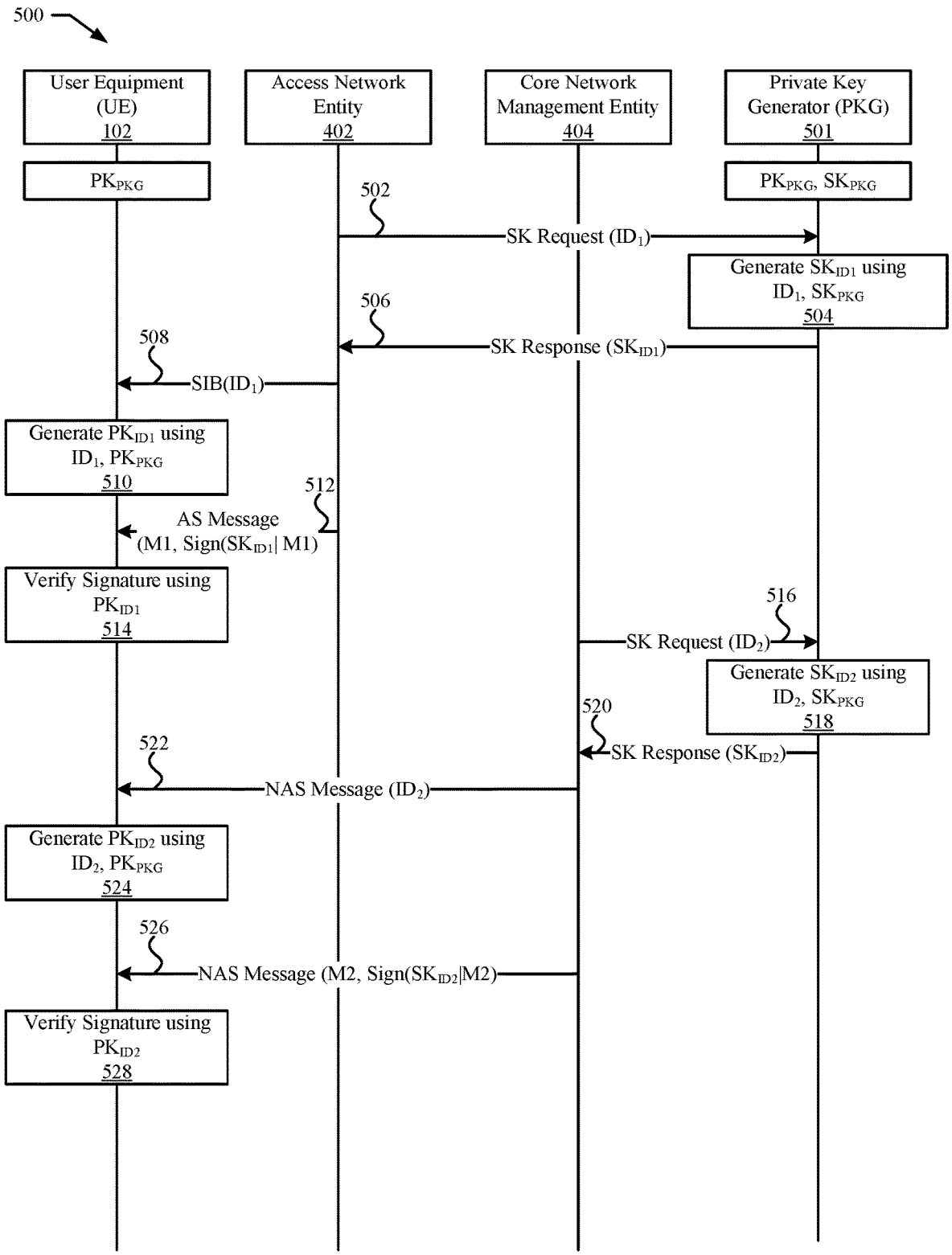
FIG. 5A illustrates an exemplary message exchange using identity-based message integrity protection and verification, according to some embodiments.

FIG. 5A illustrates a diagram 500 of an exemplary message exchange using identity-based message integrity protection and verification. Any network entity in the access network or in the core network of a cellular wireless network can apply identity-based message integrity protection for communication to the UE 102 to verify by obtaining a private key that corresponds to their identity from a private key generator (PKG) server. Initially, the UE 102 can be configured with a public key $PK_{PKG}$ of the PKG server 501, while the PKG server 501 can be configured with the public key $PK_{PKG}$ and a corresponding private key $SK_{PKG}$. In order to provide message integrity protection for access stratum (AS) level signaling messages communicated by the access network entity 402 to the UE 102, the access network entity 402 interact with the PKG server 501 to obtain a ID-based private key with which to generate signatures to accompany the messages. At 502, the access network entity 402 can send to the PKG server 501 a request for a private key, e.g., SK Request($ID_1$) based on an ID value, e.g., $ID_1$, of the access network entity 402. At 504, the PKG server 501 generates the private key $SK_{ID1}$ using the received identity value ID1 of the access network entity 402 and also using a private key of the PKG server 501, namely $SK_{PKG}$. At 506, the PKG server 501 sends to the access network entity 402 a response that includes the private key, e.g., SK Response($SK_{ID1}$). At 508, the access network entity 402 provides its ID value ID1 to the UE 102, e.g., broadcast in a system information block (SIB) message. At 510, the UE 102 generates a public key $PK_{ID1}$ for the access network entity 402 using the ID value ID1 and the public key $PK_{PKG}$ of the PKG server 501. At 512, the access network entity 402 sends an access stratum (AS) signaling message to the UE 102 that includes message content M1 and a signature Sign($SK_{ID1}$|M1) that is generated for the message content M1 using the private key $SK_{ID1}$. At 514, the UE 102 verifies the signature of the AS signaling message using the public key $PK_{ID1}$. When the signature is verified, the UE 102 can determine that the AS signaling message can be trusted. When the signature does not verify, the UE 102 can treat the AS signaling message as suspect and act accordingly, e.g., ignore and/or discard the AS signaling message. The access network entity 402 can include an NB, eNB, gNB, or femto-cell (home-based) equivalent.

A core network management entity 404 can use the same mechanism to obtain a message integrity protection key from the PKG server 501 to use for protecting non-access stratum (NAS) level signaling messages as done by the access network entity 402 to protect AS level signaling messages. At 516, the core network management entity 404 can send to the PKG server 501 a request for a private key, e.g., SK Request($ID_2$) based on an ID value, e.g., $ID_2$, of the core network management entity 404. At 518, the PKG server 501 generates the private key $SK_{ID2}$ using the received identity value $ID_2$ of the core network management entity 404 and also using the private key $SK_{PKG}$ of the PKG server 501. At 520, the PKG server 501 sends to the core network management entity 404 a response that includes the private key, e.g., SK Response($SK_{ID2}$). At 522, the core network management entity 404 provides its ID value $ID_2$ to the UE 102, e.g., unicast to the UE 102 in a NAS level signaling message. At 524, the UE 102 generates a public key $PK_{ID2}$ for the core network management entity 404 using the ID value $ID_2$ and the public key $PK_{PKG}$ of the PKG server 501. At 526, the core network management entity 404 sends a NAS signaling message to the UE 102 that includes message content M2 and a signature Sign($SK_{ID2}$|M2) that is generated for the message content M2 using the private key $SK_{ID2}$. At 528, the UE 102 verifies the signature of the NAS signaling message using the public key $PK_{ID2}$. When the signature is verified, the UE 102 can determine that the NAS signaling message can be trusted. When the signature does not verify, the UE 102 can treat the NAS signaling message as suspect and act accordingly, e.g., ignore and/or discard the NAS signaling message. The core network management entity 404 can include an MME, AMF, AUSF, HSS, or another core network management function server. As NAS messages from the core network management entity 404 are communicated through the access network entity 402 and embedded within RRC messages provided by access network entity 402 to the UE 102, in various embodiments, the embedded NAS message may include a NAS signature, while the encompassing RRC message may include an AS signature.

To protect against fraudulent misuse of a network entity that may be vulnerable to hacking, the private keys $SK_{ID1}$ and $SK_{ID2}$ provided to the access network entity 402 and to the core network management entity 404 can be restricted to be used only during finite time periods specified in their respective ID values used to generate the private keys $SK_{ID1}$ and $SK_{ID2}$. The access network entity 402 can obtain a new private key $SK_{ID1}$ for each finite time period. Similarly, the core network management entity 404 can obtain a new private key $SK_{ID2}$. The time periods used for each network entity can vary. In some embodiments, an ID value includes a field that specifies a time period for which the ID value and the resulting private key $SK_{ID}$ are valid. For example, the ID value can include a field having a string value such as "YYYY|MM|WW" to indicate a specific year, month, and week during which the ID value and private key $SK_{ID}$ are valid.

In some embodiments, the PKG server 501 can determine whether to provide an updated private key $SK_{ID}$ to a network entity based on the ID value submitted to the PKG server 501. In some embodiments, the PKG server can deny providing an updated private key $SK_{ID}$ to a network entity, such as responsive to a report that the network entity has been compromised. In some embodiments, the ID value can include a field that indicates a particular type of operation for a network entity, e.g., a field having a string value that contains "CSG" as an indication that an access network entity is intended for connections with a closed subscriber group (CSG). As such, the access network entity that includes a CSG value cannot be changed to operate as a public cell, rather than as a private femto-cell as intended by the MNO with which the femto-cell is associated. The UE 102 can recognize an access network entity as a private femto-cell based on the presence of the CSG value in the access network entity's ID and can avoid communicating private information or following redirection commands that may indicate the access network entity is masquerading as a public cell. Representative redirection commands include directing a UE to move to a circuit-switched network as part of a CSFB procedure. Representative requests for private information, such as for an IMSI/SUPI, can include commands that occur during error handling procedures when a core network entity fails to retrieve a UE context.

Figure 5B:
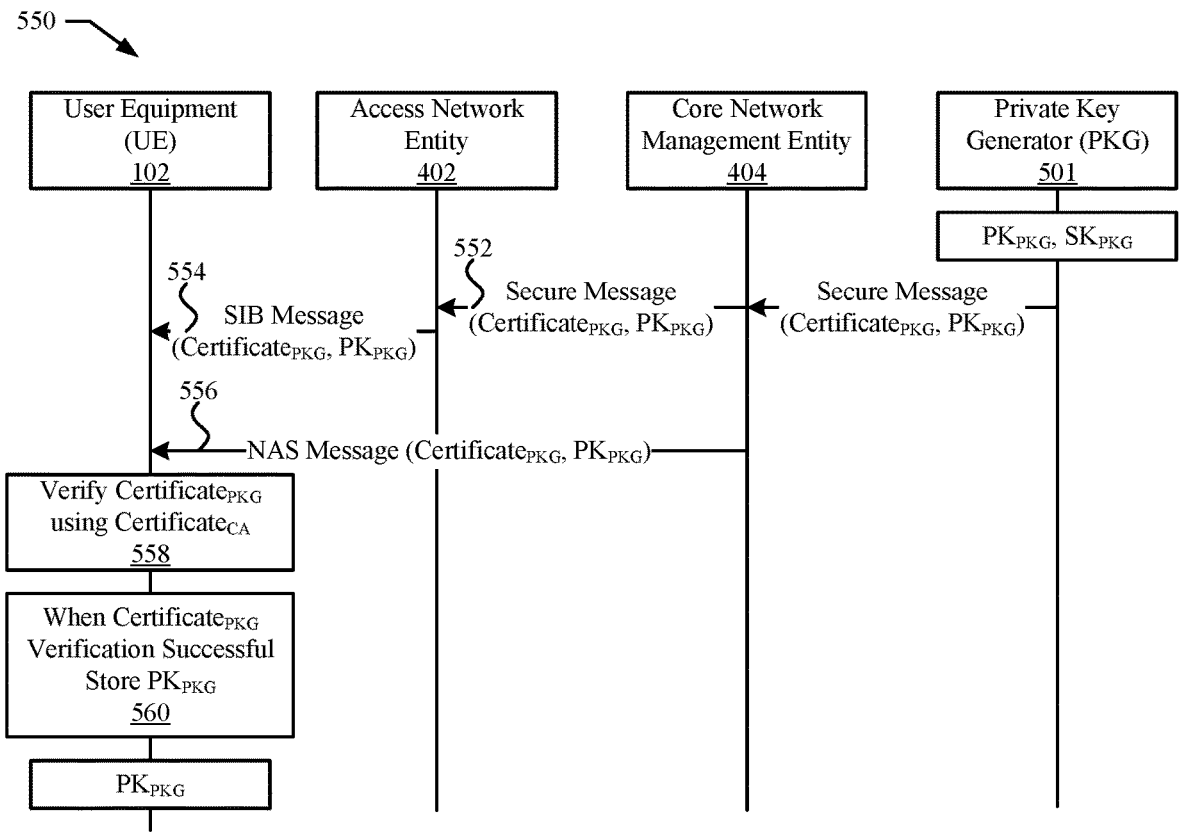
FIGS. 5B and 5C illustrate exemplary distribution mechanisms for providing a public key of the private key generator server to a wireless device, according to some embodiments.
Figure 5C:
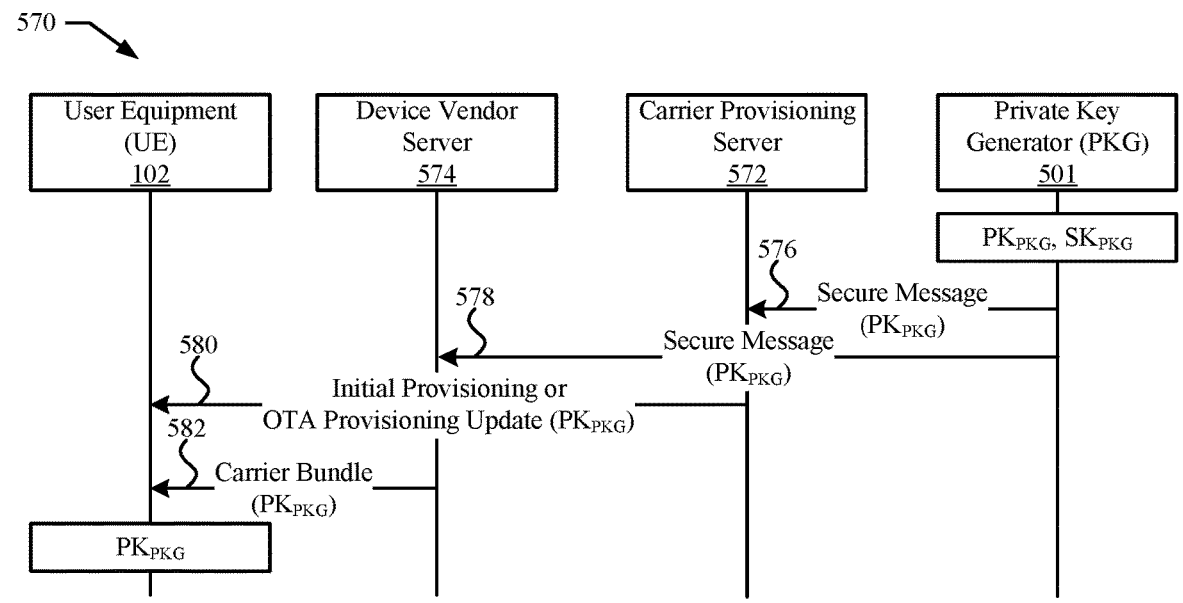

FIGS. 5B and 5C illustrate diagrams 550 and 570 of exemplary distribution mechanisms for providing a public key of the private key generator server 501, e.g., $PK_{PKG}$, to a wireless device, e.g., UE 102. The public key $PK_{PKG}$ of the PKG server 501 can be provided to the UE 102 before the UE 102 attempts to camp on and/or connect to the wireless network of the network entity, such as during subscriber identity module (SIM) provisioning from a mobile network operator (MNO) server, during carrier bundle provisioning from a third-party server, during device manufacture, during device sales distribution, and/or by querying the PKG server 501 directly for the public key $PK_{PKG}$. The public key $PK_{PKG}$ of the PKG server 501 can also be broadcast to the UE 102 by network entities, e.g., access network entity 402 and/or core network management entity 404, in various access stratum (AS) system information block (SIB) messages and/or in various non-access stratum (NAS) messages. The messages can include the $PK_{PKG}$ along with a certificate that the UE 102 can use to verify the sender of the message based on a certificate authority (CA) certificate that the UE 102 and the PKG server 501 have in common. Representative network entities that can communicate the $PK_{PKG}$ to the UE 102 include those that provide the PKG server 501 function and/or interface therewith.

As illustrated is diagram 550, the PKG server 501 can generate (or have previously generated) a public key $PK_{PKG}$ and private key $SK_{PKG}$ pair. As previously described, the PKG server 501 uses the private key $SK_{PKG}$ to generate private keys for a network entity based on an identifier of the network entity. The corresponding public key $PK_{PKG}$ is used by the UE 102 to generate a corresponding public key for the network entity in order to verify message signatures provided by the network entity, the message signatures generated using the network entity's private key. At 552, the PKG server 501 can communicate to a core network management entity 404 the public key $PK_{PKG}$ of the PKG server 501 in a secure message. At 552, the PKG server 501 can also communicate to the access network entity 402 directly (not shown) or via the core network management entity 404 the public key $PK_{PKG}$ of the PKG server 501 in a secure message. The secure message can include a copy of the public key $PK_{PKG}$ and a certificate of the PKG server 501, indicated as $Certificate_{PKG}$. The core network management entity 404, in some embodiments, can verify the certificate of the PKG server using a certificate of a certificate authority (CA) that both the core network management entity 404 and the PKG server 501 have in common in order to trust the secure message that includes the public key $PK_{PKG}$ of the PKG server 501 communicated to the core network management entity 404. In some embodiments, the core network management entity 404 need not verify the certificate of the PKG server 501 in order to trust the secure message's contents received from the PKG server 501, as the secure message can be delivered via a secure connection to the core network management entity 404. Similarly, the access network entity 402, in some embodiments, can verify the certificate of the PKG server using a certificate of a certificate authority (CA) that both the access network entity 402 and the PKG server 501 have in common in order to trust the secure message that includes the public key $PK_{PKG}$ of the PKG server 501 communicated to the access network entity 402. In some embodiments, the access network entity 402 need not verify the certificate of the PKG server 501 in order to trust the secure message's contents received from the PKG server 501, as the secure message can be delivered via a secure connection to the access network entity 402. The PKG server 501 can communicate the public key $PK_{PKG}$ at regular intervals and/or on demand. The PKG server 501 can communicate updated values for the public key $PK_{PKG}$ when new versions of the $PK_{PKG}$ and $SK_{PKG}$ pair are created.

The access network entity 402 can communicate the certificate $Certificate_{PKG}$ and the public key $PK_{PKG}$ to the UE 102 in one or more system information block (SIB) messages as indicated at 554. To accommodate the size of the certificate $Certificate_{PKG}$ and the public key $PK_{PKG}$, the SIB message can include sufficient space in the data payload. Multiple independent SIB messages can include the certificate $Certificate_{PKG}$ and the public key $PK_{PKG}$, and the UE 102 can receive the certificate $Certificate_{PKG}$ and the public key $PK_{PKG}$ in any one of the multiple SIB messages used by the access network entity 402 to broadcast them. The core network management entity 404 can also communicate the certificate $Certificate_{PKG}$ and the public key $PK_{PKG}$ to the UE 102 in one or more different NAS messages as indicated at 556. The NAS messages can be communicated before and/or after establishment of a security context at the NAS level between the UE 102 and the core network management entity 404. The UE 102, at 558, can verify the certificate $Certificate_{PKG}$ using a certificate of a CA that is common between the UE 102 and the PKG server 501. In some embodiments, the CA can be a root CA, while in some embodiments the CA can be a subordinate CA of the root CA. As the UE 102 can be used for different network operators and in different geographic regions, the UE 102 can include certificates for multiple root CAs and/or multiple subordinate CAs, and when at least one of these certificates is common with the certificate of the PKG server 501, the UE 102 can verify the certificate $Certificate_{PKG}$ received from the access network entity 402 and/or from the core network management entity 404. When the certificate $Certificate_{PKG}$ verification is successful, at 560, the UE 102 can trust the message and accept the included public key $PK_{PKG}$ of the PKG server 501 as genuine and store the public key $PK_{PKG}$ for use when verifying messages from network entities as described herein.

Diagram 570 illustrates another mechanism by which the public key $PK_{PKG}$ of the PKG server 501 can be provided to the UE 102. At 576, the PKG server 501 can communicate the public key $PK_{PKG}$ to a carrier provisioning server 572 in a secure message using a secure communication link between the PKG server 501 and the carrier provisioning server 572. Alternatively, and/or additionally, the PKG server 501 can communicate, at 578, the public key $PK_{PKG}$ to a device vendor server 574 in a secure message via a separate secure communication link. At 580, the carrier provisioning server 572 can download to the UE 102 the public key $PK_{PKG}$, during an initial provisioning session and/or during an over-the-air (OTA) provisioning update sessions. Provisioning sessions use secure communication links, and entities within the UE 102, e.g., a secure element, such as eUICC 108 and/or a removable universal SIM card, can receive the public key $PK_{PKG}$ securely during the provisioning session or provisioning update. The secure element, e.g., eUICC 108, can share the public key $PK_{PKG}$ with external processing circuitry of the UE 102, e.g., processor 104 and/or baseband component 110 to use for verification of messages from network entities as described herein. For roaming scenarios, a network entity of a visited public land mobile network (VPLMN) can provide the public key $PK_{PKG}$ to the UE 102 in one or more AS SIB messages and/or in one or more NAS messages. In some embodiments, the VPLMN obtains the public key $PK_{PKG}$ from a network entity of a home PLMN (HPLMN) to communicate to the UE 102. In some embodiments, the VPLMN communicates the $PK_{PKG}$ applicable for network entities of its own PKG server 501. At 582, the device vendor server 574 can also provide the public key $PK_{PKG}$ to the UE 102, such as in an initial carrier bundle upload to the UE 102 and/or during a carrier bundle update to the UE 102. Each of the mechanisms illustrated in FIGS. 5B and 5C can be used individually or together, e.g., one mechanism used for initial loading of a $PK_{PKG}$ and another mechanism used for subsequent updating of a $PK_{PKG}$.

Figure 6:
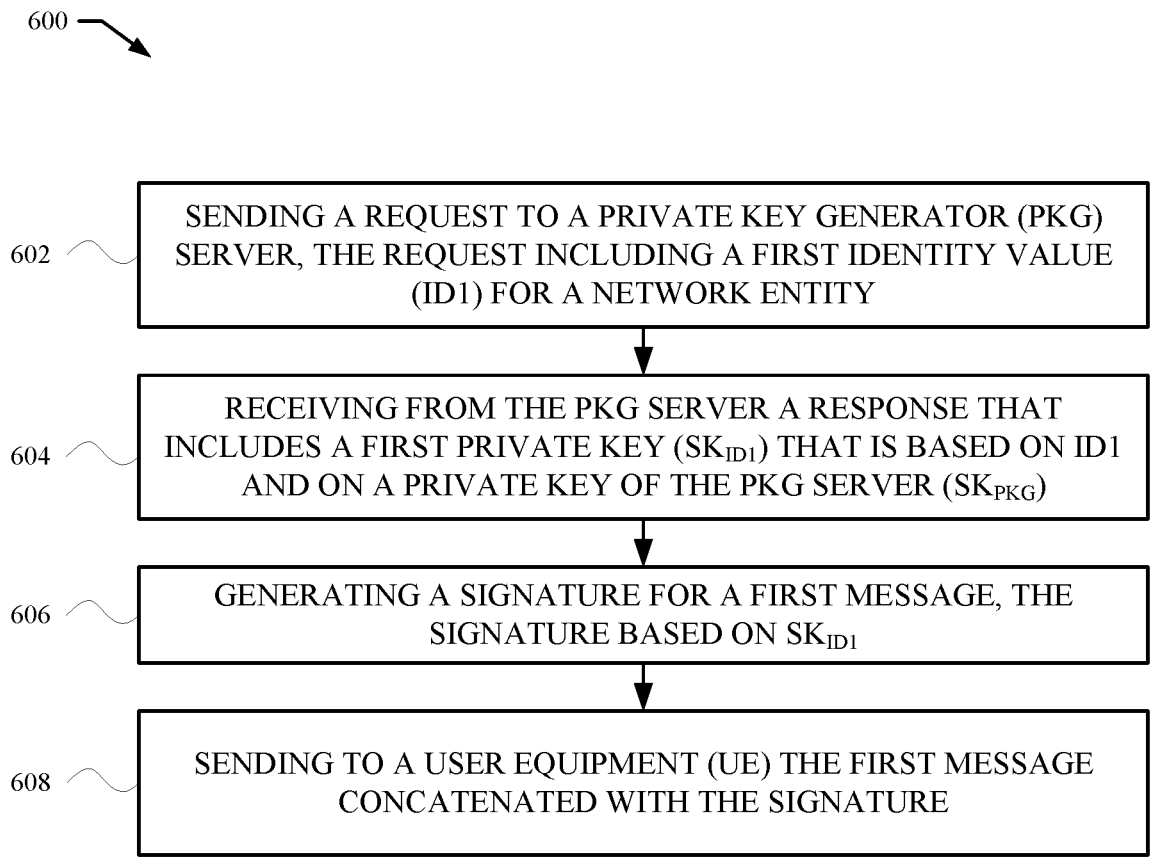
FIG. 6 illustrates a flow diagram of an exemplary sequence of actions by a network entity to protect the integrity of a message communicated to a wireless device, according to some embodiments.

FIG. 6 illustrates a flow diagram 600 of an exemplary sequence of actions by a network entity to protect the integrity of a message communicated to a wireless device. At 602, a network entity, e.g., access network entity 402 or core network management entity 404, sends a request to the PKG server 501, the request including a first identity value ID1 for the network entity. At 604, the network entity receives from the PKG server 501 a response that includes a first private key SKID1 that is based on the first identity value ID1 for the network entity and on a private key of the PKG server SKPKG. At 606, the network entity generates a signature for a first message, the signature based on the private key SKID1 of the network entity. At 608, the network entity sends to the UE 102 the first message concatenated with the signature.

In some embodiments, the network entity provides the identity value ID1 of the network entity to the UE 102 before sending the first message. In some embodiments, the UE 102 verifies the first message using a first public key $PK_{ID1}$ that corresponds to the first private key $SK_{ID1}$. In some embodiments, the UE 102 generates the first public key $PK_{ID1}$ using the identity value ID1 of the network entity and using a public key of the PKG server $PK_{PKG}$ that corresponds to the private key $SK_{PKG}$ of the PKG server. In some embodiments, the network entity is a NodeB (NB), an evolved NodeB (eNB), a next generation NodeB (gNB) of a cellular wireless network, or a femto-cell home-based equivalent network entity to the NB, eNB, or gNB, and the first message is an access stratum (AS) message. In some embodiments, the first message is a radio resource control (RRC) signaling message. In some embodiments, the first message is a random access response (RAR) message sent to the UE 102 as part of a random access channel (RACH) procedure. In some embodiments, the network entity is a mobility management entity (MME), access and mobility management function (AMF) server, a home subscriber server (HSS), an authentication server function (AUSF), or another core network entity, and the first message is a non-access stratum (NAS) message. In some embodiments, the identity value ID1 of the network entity is a concatenation of field values that include a first time stamp value that indicates a first time period during which the identity value ID1 is valid. In some embodiments, before expiration of the first time period, the network entity sends a second request to the PKG server 501, the second request including a second identity value $ID_2$ for the network entity and including a second time stamp value that indicates a second time period during which $ID_2$ is valid. Subsequently, the network entity receives from the PKG server 501 a second response that includes a second private key $(SK_{ID2})$ that is based on the second ID value $ID_2$ and also on the private key $SK_{PKG}$ of the PKG server 501. In some embodiments, the network entity provides to the PKG server 501 one or more identity values for different time periods and obtains corresponding private keys based on each of the one or more identity values. In some embodiments, only one private key used for ID-based message integrity protection may be valid during any single time period. In some embodiments, different private keys based on different ID values can be used for different, non-overlapping time periods. In some embodiments, the ID value ID1 includes a concatenation of field values that include a particular field value indicating the network entity is a femto-cell an operates for a closed subscriber group (CSG).

Figure 7:
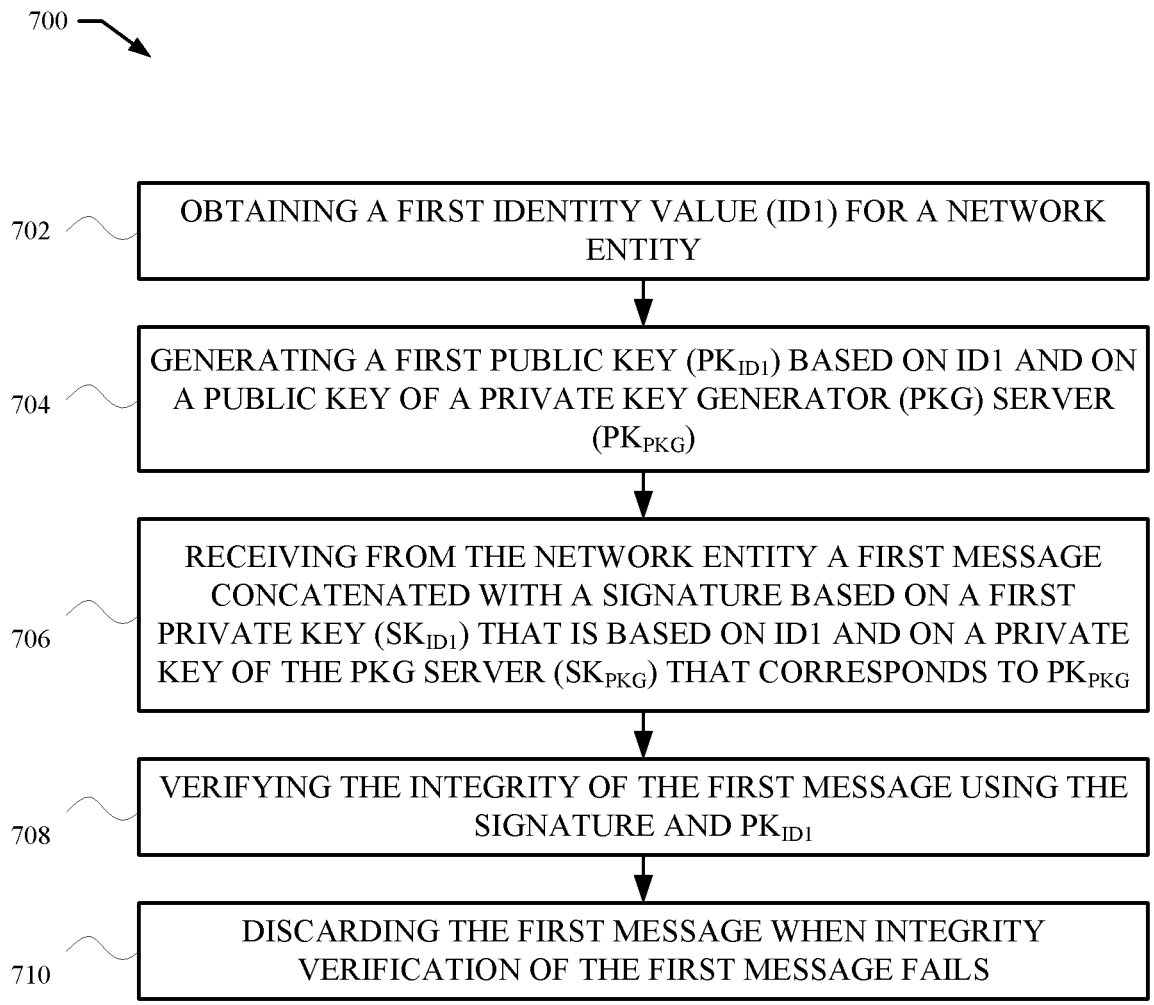
FIG. 7 illustrates a flow diagram of an exemplary sequence of actions by a wireless device to verify integrity of a message received from a network entity, according to some embodiments.

FIG. 7 illustrates a flow diagram 700 of an exemplary sequence of actions by a wireless device to verify integrity of a message received from a network entity. At 702, the wireless device, e.g., UE 102, obtains a first identity value ID1 for a network entity, e.g., access network entity 402 or core network management entity 404. At 704, the UE 102 generates a first public key $PK_{ID1}$ based on the first identity value ID1 for the network entity and on a public key $PK_{PKG}$ of the PKG server 501. At 706, the UE 102 receives from the network entity a first message concatenated with a signature based on a first private key $SK_{ID1}$ that is based on the first identity value ID1 and on the private key $SK_{PKG}$ of the PKG server 501 that corresponds to the public key $PK_{PKG}$ of the PKG server 501. At 708, the UE 102 verifies the integrity of the first message using the signature and the public key $PK_{ID1}$ of the network entity. At 710, the UE 102 ignores or discards the first message when integrity verification of the first message fails.

In some embodiments, the UE 102 obtains the first identity value ID1 for the network entity by extracting the first identity value ID1 from a message transmitted by the network entity. In some embodiments, the message includes a system information block (SIB) message broadcast by the network entity. In some embodiments, the UE 102 obtains the first identity value ID1 for the network entity by deriving ID1 based on information broadcast by the network entity. In some embodiments, the network entity is an NB, eNB, gNB, or a femto-cell home-based equivalent network entity to the NB, eNB, or gNB of a cellular wireless network, and the first message is an access stratum (AS) message. In some embodiments, the first message is a radio resource control (RRC) signaling message. In some embodiments, the first message is a random access response (RAR) message received from the network entity as part of a random access channel (RACH) procedure. In some embodiments, the network entity is a mobility management entity (MME), access and mobility management function (AMF) server, a home subscriber server (HSS), an authentication server function (AUSF), or another core network entity, and the first message is a non-access stratum (NAS) message. In some embodiments, the identity value ID1 of the network entity is a concatenation of field values that include a first time stamp value that indicates a first time period during which the identity value ID1 is valid. In some embodiments, the ID value ID1 includes a concatenation of field values that include a particular field value indicating the network entity is a femto-cell an operates for a closed subscriber group (CSG).

Figure 8:
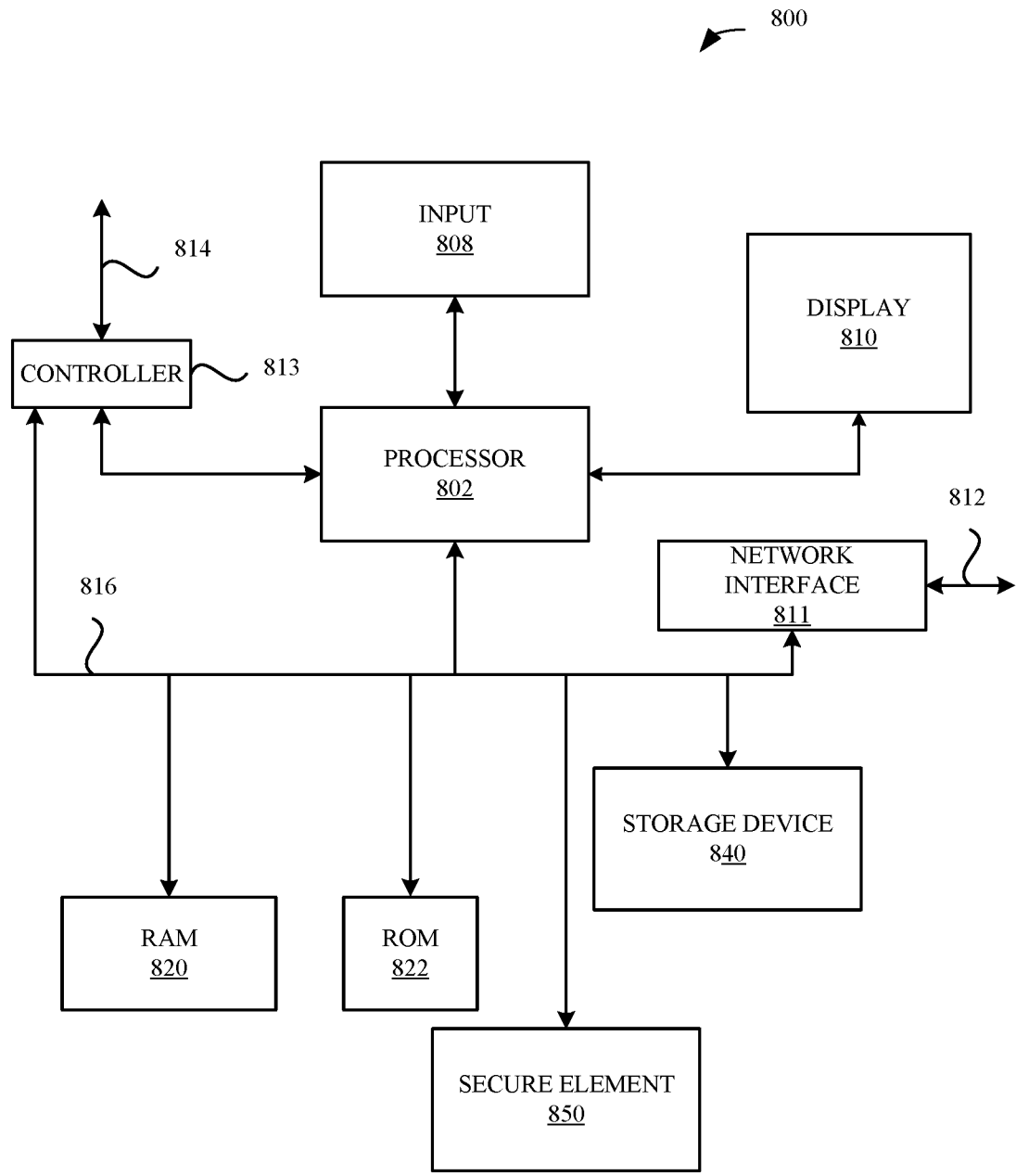
FIG. 8 illustrates a detailed view of a representative computing device that can be used to implement various methods described herein, according to some embodiments.

FIG. 8 illustrates a detailed view of a representative computing device 800 that can be used to implement various methods described herein, according to some embodiments. In particular, the detailed view illustrates various components that can be included in the UE 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 that can be controlled by the processor 802 to display information to the user. A data bus 816 can facilitate data transfer between at least a storage device 840, the processor 802, and a controller 813. The controller 813 can be used to interface with and control different equipment through and equipment control bus 814. The computing device 800 can also include a network/bus interface 811 that couples to a data link 812. In the case of a wireless connection, the network/bus interface 811 can include a wireless transceiver.

The computing device 800 also includes a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800. The computing device 800 can further include a secure element (SE) 850, which can represent an eUICC 108 of the UE 102.

The various aspects, embodiments, implementations or features of the described embodiments can be used separately or in any combination. Software, hardware, or a combination of hardware and software can implement various aspects of the described embodiments. The described embodiments can also be embodied as computer readable code on a non-transitory computer readable medium. The non-transitory computer readable medium is any data storage device that can store data, which can thereafter be read by a computer system. Examples of the non-transitory computer readable medium include read-only memory, random-access memory, CD-ROMs, DVDs, magnetic tape, hard disk drives, solid state drives, and optical data storage devices.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of verifying message integrity, the method comprising:
   by a user equipment (UE):
      obtaining a first identity value (ID1) for a network entity;
      generating a first public key ($PK_{ID1}$) based on ID1 and on a public key of a private key generator (PKG) server ($PK_{PKG}$); and
      prior to establishing a security context with the network entity:
         receiving from the network entity a first message concatenated with a signature based on a first private key ($SK_{ID1}$) that is based on ID1 and on a private key of the PKG server ($SK_{PKG}$) that corresponds to $PK_{PKG}$;
         verifying integrity of the first message using the signature and $PK_{ID1}$; and
         discarding the first message when integrity verification of the first message fails.

2. The method of claim 1, wherein obtaining ID1 for the network entity comprises extracting ID1 from a message transmitted by the network entity.

3. The method of claim 2, wherein the message comprises a system information block (SIB) message broadcast by the network entity.

4. The method of claim 1, wherein obtaining ID1 for the network entity comprises deriving ID1 based on information broadcast by the network entity.

5. The method of claim 1, wherein:
   the network entity comprises a next generation NodeB (gNB) of a cellular wireless network; and
   the first message comprises an access stratum (AS) message.

6. The method of claim 5, wherein the first message comprises a radio resource control (RRC) signaling message.

7. The method of claim 6, wherein the first message comprises a random access response (RAR) message received from the network entity as part of a random access channel (RACH) procedure.

8. The method of claim 1, wherein:
   the network entity comprises an access and mobility management function (AMF) server of a cellular wireless network; and
   the first message comprises a non-access stratum (NAS) message.

9. The method of claim 1, wherein:
   ID1 comprises a concatenation of field values including a first time stamp value that indicates a first time period during which ID1 is valid.

10. The method of claim 1, wherein:
    the network entity comprises a femto-cell; and
    ID1 comprises a concatenation of field values including a field value indicating the femto-cell operates for a closed subscriber group (CSG).

11. An apparatus configurable for operation in a user equipment (UE), the apparatus comprising a processor and a memory storing instructions that, when executed by the processor, cause the UE to perform steps that include:
    obtaining a first identity value (ID1) for a network entity;
    generating a first public key ($PK_{ID1}$) based on ID1 and on a public key of a private key generator (PKG) server ($PK_{PKG}$); and
    prior to establishing a security context with the network entity:
       receiving from the network entity a first message concatenated with a signature based on a first private key ($SK_{ID1}$) that is based on ID1 and on a private key of the PKG server ($SK_{PKG}$) that corresponds to $PK_{PKG}$;
       verifying integrity of the first message using the signature and $PK_{ID1}$; and
       discarding the first message when integrity verification of the first message fails.

12. The apparatus of claim 11, wherein obtaining ID1 for the network entity comprises extracting ID1 from a message transmitted by the network entity.

13. The apparatus of claim 12, wherein the message comprises a system information block (SIB) message broadcast by the network entity.

14. The apparatus of claim 11, wherein obtaining ID1 for the network entity comprises deriving ID1 based on information broadcast by the network entity.

15. The apparatus of claim 11, wherein:
    the network entity comprises a next generation NodeB (gNB) of a cellular wireless network; and the first message comprises an access stratum (AS) message.

16. The apparatus of claim 15, wherein the first message comprises a radio resource control (RRC) signaling message.

17. The apparatus of claim 16, wherein:
the first message comprises a random access response (RAR) message received from the network entity as part of a random access channel (RACH) procedure.

18. The apparatus of claim 11, wherein:
the network entity comprises an access and mobility management function (AMF) server of a cellular wireless network; and
the first message comprises a non-access stratum (NAS) message.

19. The apparatus of claim 11, wherein:
ID1 comprises a concatenation of field values including a first time stamp value that indicates a first time period during which ID1 is valid.

20. The apparatus of claim 11, wherein:
the network entity comprises a femto-cell; and
ID1 comprises a concatenation of field values including a field value indicating the femto-cell operates for a closed subscriber group (CSG).

21. A user equipment (UE) comprising:
wireless circuitry comprising one or more antennas; and
a processor and a memory communicatively coupled to the wireless circuitry, the memory storing instructions that, when executed by the processor, cause the UE to perform steps that include:
obtaining a first identity value (ID1) for a network entity;
generating a first public key ($PK_{ID1}$) based on ID1 and on a public key of a private key generator (PKG) server ($PK_{PKG}$); and
prior to establishing a security context with the network entity:
receiving from the network entity a first message concatenated with a signature based on a first private key ($SK_{ID1}$) that is based on ID1 and on a private key of the PKG server ($SK_{PKG}$) that corresponds to $PK_{PKG}$;
verifying integrity of the first message using the signature and $PK_{ID1}$; and
discarding the first message when integrity verification of the first message fails.

22. The UE of claim 21, wherein:
ID1 comprises a concatenation of field values including a first time stamp value that indicates a first time period during which ID1 is valid.

* * * * *